United States Patent [19]
Capper et al.

[11] Patent Number: 5,321,577
[45] Date of Patent: Jun. 14, 1994

[54] PROTECTOR MODULE FOR TELEPHONE LINE PAIR

[75] Inventors: Harry M. Capper, Harrisburg; James W. Robertson, Oberlin, both of Pa.

[73] Assignee: The Whitaker Corporation, Wilmington, Del.

[21] Appl. No.: 880,449

[22] Filed: May 8, 1992

[51] Int. Cl.[5] .......................... H01R 9/24; H02H 3/22
[52] U.S. Cl. .................................... 361/119; 361/823; 361/111
[58] Field of Search ............... 361/110, 111, 114, 127, 361/128, 120, 426, 823

[56] References Cited

U.S. PATENT DOCUMENTS

| | | | |
|---|---|---|---|
| 4,575,169 | 3/1986 | Duplatre et al. | 361/390 |
| 4,624,518 | 11/1986 | Seidel | 439/97 R |
| 4,675,778 | 6/1987 | Cwirzen | 361/119 |
| 4,742,541 | 5/1988 | Cwirzen et al. | 379/412 |
| 4,901,189 | 2/1940 | Merriman et al. | 361/119 |
| 5,006,077 | 4/1991 | Loose et al. | 439/409 |
| 5,120,245 | 6/1992 | Robertson et al. | 439/395 |

Primary Examiner—A. D. Pellinen
Assistant Examiner—Ronald W. Leja
Attorney, Agent, or Firm—Anton P. Ness

[57] ABSTRACT

A single modular assembly (10) has two terminals (18) in housing cavities (28) each with a pair of slots (38) for termination by rotary actuation to respective conductors of two cables, for crossconnecting or splicing the tip and ring lines of a customer's service line with those of a cable extending to the main distribution line. Each terminal (18) is in electrical engagement with a circuit wire (40) extending to a separate portion (20) of the module for electrical connection to an active electrode of a protector element (24). The two protector elements (24) each include a ground electrode (76) grounded to a common ground strap (54) which includes a contact section (60,64) exposed along the bottom of the module to be assuredly engaged with a ground strap (122) along the floor (112) of the enclosure (110) upon mounting of the module (10) therein, for grounding to a ground stud for external system grounding.

7 Claims, 4 Drawing Sheets

PROTECTOR MODULE FOR TELEPHONE LINE PAIR

FIELD OF THE INVENTION

This relates to the field of electrical connectors and more particularly to connectors for connecting pairs of signal wires together.

BACKGROUND OF THE INVENTION

In the telecommunications industry, telephone cable is introduced to individual telephone sites such as residences, mainly through use of a splice of the signal wires of the cable to respective house wires at a junction located outside or inside the house. The junction is housed within a protective enclosure which is mounted usually to an outside wall of the house. One example of an assembly of a splice terminal block and self-sealing enclosure therefor is disclosed in U.S. patent application Ser. Nos. 07/708,405 filed May 31, 1991 and 07/708,407 also filed May 31, 1991, both assigned to the assignee hereof. Therein, a terminal block has a single-piece barrel-shaped terminal with connecting sections for both wires to be spliced, and the terminal is of the insulation piercing or displacement type which eliminates the need for stripping the insulation from the signal wire conductors. A dielectric housing includes an integrally molded center post within a tubular terminal-receiving housing section, both coextending from a common base section and defining an annular cavity, the housing section providing wire-receiving openings through side walls and into the cavity aligned with an aperture through the center post, enabling insertion of wire ends during splicing.

A barrel-shaped terminal and an associated lug-capped tubular actuator is then assembled to the housing, with the barrel terminal surrounding the center post within the cavity and having apertured insulation displacement contact sections which are initially aligned with the wire-receiving openings of the housing and center post, and the actuator also having profiled apertures therethrough extending partially around the circumference and also aligned with the wire-receiving openings of the housing, center post and terminal. The lug extends above the housing upon assembly to be accessible to tooling for rotation thereof to rotate the actuator and the terminal.

During splicing the wire ends of both wires are inserted into respective openings and through the apertured contact sections until abutting stop surfaces of the housing which then holds the wire ends at two spaced locations, both outside and within the terminal wall; the actuator is then rotated through an angular distance of about a quarter turn in turn rotating the terminal, and the constricted edges of a precisely profiled slot extending from each of the terminal's apertures penetrate the wire insulation of both wires simultaneously and engage the conductors therewithin, completing the splice.

The terminal blocks of Ser. No. 07/708,405 are modular in nature, comprising a pair defined in the same housing member for mounting within an enclosure adapted for a plurality of such modules. The two-terminal block housing is mountable in a selected orientation such that the wire-receiving openings of each of the terminal blocks are oriented facing a cable exit of the enclosure, or other common point from where the pairs of conductors originate as discrete wires from two cables.

It is desired to provide the telephone line to a particular customer with overvoltage protection on the circuits which protect the circuits of the customer's equipment from energy surface, such as from lightning strikes and the like. Several examples of protector elements are disclosed in U.S. Pat. Nos. 4,158,869; 4,161,762; and 4,133,019. Modules containing such protectors are disclosed in U.S. Pat. Nos. 4,742,541; 4,159,500; 4,613,732 and 4,675,778. The telecommunications industry has established standards for performance and certain dimensional and design requirements for such protectors; one example is Bellcore Technical Reference No. TR-TSY-000070, Issue Feb. 1, 1985, entitled "Customer Station Gas Tube Protector Units".

There is disclosed in U.S. patent application Ser. No. 07/863,626 filed Apr. 3, 1992 and assigned to the assignee hereof, a protector module for a telephone line junction box and a method of protecting a circuit. A module contains an array of protectors removably contained therein, where the module includes a housing of dielectric material defining protector-receiving cavities into which respective protectors are insertable. The module includes a ground plate disposed across the upper face of the housing body and includes a plurality of openings aligned with the cavities to define the peripheries of the plurality of cavities to become electrically engaged with a ground electrode of each protector. In one embodiment a first contact is mounted at the bottom of each cavity and includes a first contact section on a spring arm exposed within the cavity for electrical engagement with an active electrode on the bottom of the protector upon protector insertion. A second contact section extends below the base of the housing to be easily terminatable to an associated conductor wire of a stub cable of the main distribution line which then extends along the base of the housing to the housing of another module for termination to a terminal which splices the conductor wire to a conductor of the service wire, as in U.S. Pat. No. 5,0⋯,077, after which the exposed stub cable conductor wires and the second contact sections are potted and environmentally sealed. The ground plate is commoned to a ground stud of the enclosure for commoning to a system ground.

It is desired to provide a module for a pair of signal wires of a customer line with protector elements which can be assembled within an enclosure such that each protector is electrically connected in-line for the circuits interconnected by the terminals of the terminal block contained within the enclosure, upon termination of a service wire to a terminal.

It is desired that such module permit in-line circuit protection simultaneously with splicing of the pair of wires of the service line.

SUMMARY OF THE INVENTION

The present invention is a single module having two barrel-shaped terminals each with a pair of insulation displacement slots for termination by rotary actuation to respective conductors of two cables, for crossconnecting or splicing the tip and ring lines of a service line extending to a customer with a cable extending to the main distribution line. Each barrel terminal is in electrical engagement with a circuit element such as a wire length extending to a respective separate portion of the module for electrical connection to an active electrode of a respective protector element within a respective housing section. The two protector elements each include a ground electrode grounded to a common ground strap which includes a contact section exposed along the bottom of the module to be assuredly engaged with a ground strap along the floor of the enclosure upon mounting of the module therein, for grounding to a ground stud for external system grounding. The wire-receiving apertures of the two housing sections containing the terminals are preferably oriented to face a cable exit of the enclosure to facilitate receipt of the conductors for wire termination upon rotation actuation of the terminals by respective lug-capped actuators.

An enclosure for protected terminal blocks or modules of the present invention includes a ground strap extending from a ground stud to each terminal block mounting region, enabling the contact section of the module ground strap to engage its top surface upon mounting of the terminal block in position.

In a separate aspect of the invention, a terminal block arrangement includes a terminal disposed within a housing with the terminal including a section to be terminated to a conductor such as through insulation displacement upon insertion of the conductor into an opening into the housing and manipulation of the terminal relative to the conductor. A groove is defined along an inner surface of the housing opposing a groove-proximate surface of the terminal and extends from a lead-receiving opening into the housing into which an uninsulated lead is insertable, so that the lead when disposed along the groove is held in compression against the surface of the terminal and is in electrical connection therewith, with the housing holding the terminal so that the groove-proximate surface is a selected spacing from the groove. The terminal thus electrically connects the uninsulated lead to the conductor when the conductor is terminated to the terminal.

It is an objective of the present invention to provide a single assembly adapted to receive and crossconnect ends of service and distribution tip and ring conductors and include integrally therewithin protection of the circuits thus defined against overvoltage.

An embodiment of the present invention will now be described by way of reference to the accompanying drawings.

DETAILED DESCRIPTION OF THE PREFERRED EMBODIMENT

Figure 1:
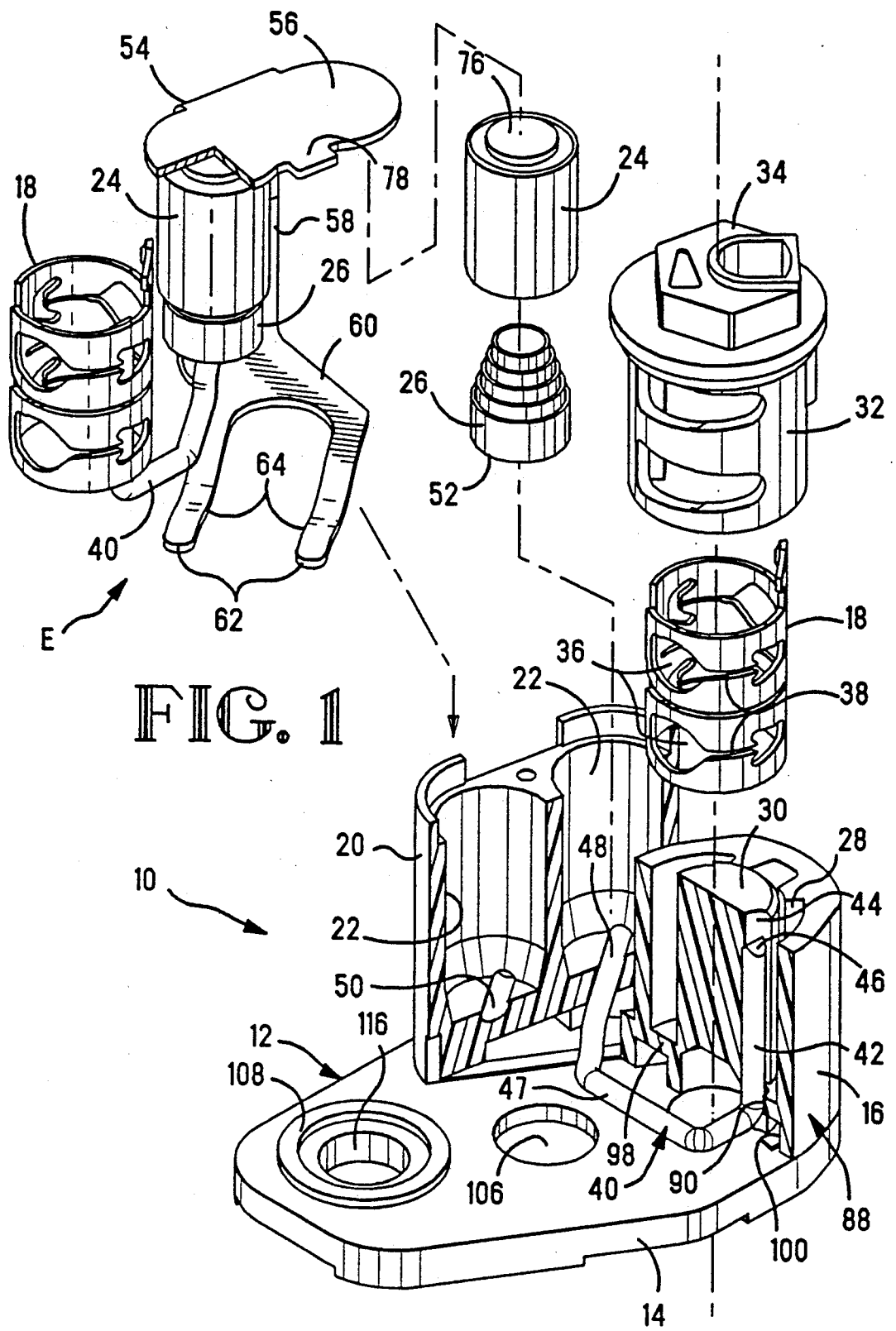
FIG. 1 is an exploded view of the components of the protector module of the present invention, with a portion of the module housing broken away to illustrate the interior of cavities thereof and one of the terminals and actuators ready for receipt into a cavity and associated protector ready for receipt into a respective cavity, and circuit wire in position, and with the other terminal, circuit wire, protector and ground strap positioned together to illustrate the electrical relationship therebetween.

Protector module 10 of the present invention includes a housing assembly 12 including a base section 14, a pair of housing sections 16 for respective barrel terminals 18, and a protector housing section 20. Protector housing section 20 preferably is molded to be integral with base section 14 and includes a pair of cavities 22 for receipt of protector elements 24 and coil springs 26 thereinto during final stages of protector module assembly. Each housing section 16 has an annular cavity 28 therein about a center post 30, into which is inserted a barrel terminal 18 to surround the center post, and thereafter is inserted an actuator 32 having a lug-shaped cap 34 adapted to be rotated by a tool to rotate terminal 18 for termination to two wires (not shown) inserted through respective apertures 134,136 (see FIG. 5) of the housing section walls, through openings 36 of the terminal and at least into apertures of the center post all coaligned, which causes profiled slots 38 extending from the openings of the terminal to penetrate the wire insulation and electrically engage both wires thereby interconnecting them.

An uninsulated via or circuit wire 40 is disposed in housing assembly 12 to extend between each terminal 18 and into each cavity 22 of protector housing section 20, to interconnect the terminal ultimately to a respective protector 24. Each circuit wire 40 includes a first end section 42 extending through an entrance opening 90 and within and along the bottom of a groove 44 vertically along center post 30 to a beveled free end 46, and also includes an intermediate section 47 and a second end section 48 extending into cavity 22 and in a groove 50 along the bottom of cavity 22. First end section 42 protrudes partially out of groove 44 to engage the inside surface of terminal 18 in intimate contact therewith when terminal 18 is inserted into annular cavity 28 upon full assembly, with beveled free end 46 facilitating initial bearing engagement with the bottom edge of a terminal 18 upon insertion of terminal 18 into cavity 28 and over first end section 42 without stubbing. Second end section 48 protrudes above groove 50 to be engaged by bottom 52 of coil spring member 26 inserted into cavity 22, which in turn engages a portion of the bottom of protector 24. A module ground strap 54 includes a cover portion 56 which extends across the tops of both cavities 22 to engage the top of both protectors 24 upon full assembly, a vertical section 58 which extends along the outside of protector housing section 20 to a bifurcated bottom section 60. Bottom section 60 includes two tines 62 which extend to free ends having downwardly arcuate contact sections 64, all as is illustrated in the representative electrical assembly E of FIG. 1. Bottom section 60 will be exposed along the bottom surface of base section 14 upon full assembly of protector module 10.

Figure 2:
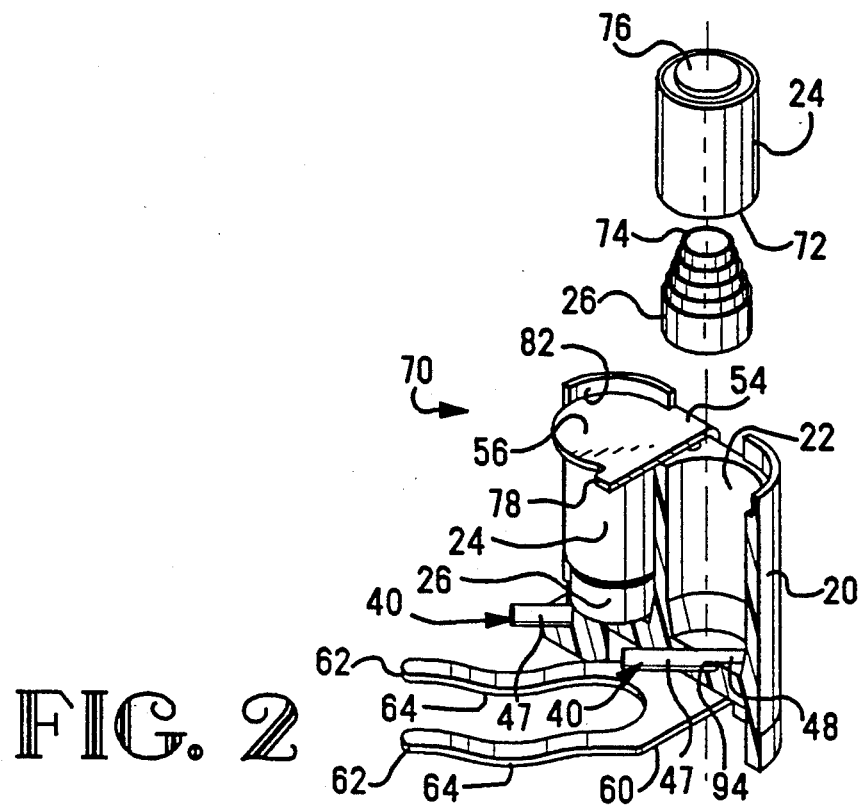
FIGS. 2 and 3 are isometric and section views illustrating a housing section of the module of FIG. 1 having a pair of cavities for receipt of protector elements thereinto.
Figure 3:
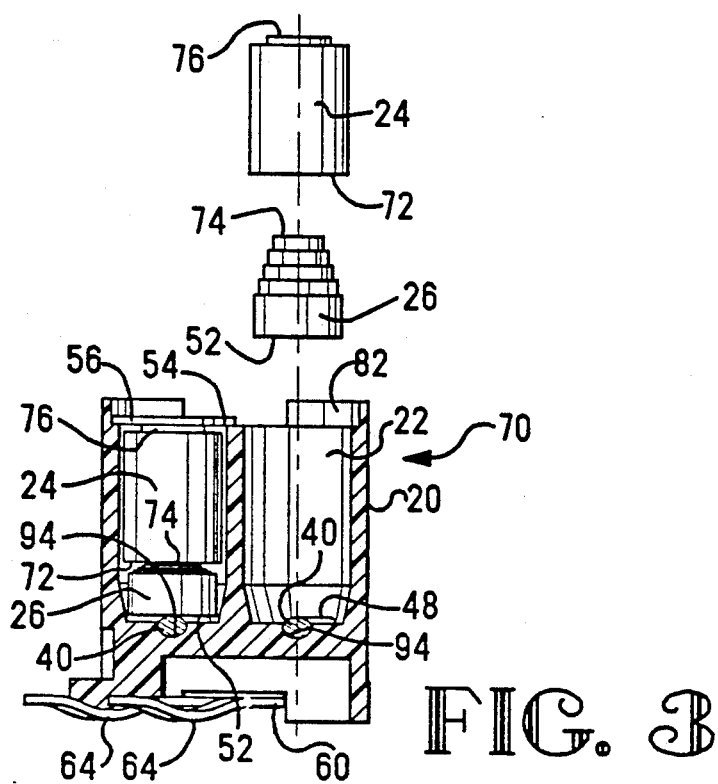

Referring to FIGS. 2 and 3, protector subassembly 70 is illustrated to comprise protector housing section 20 with coil springs 26 in both cavities 22, and protectors 24 positioned thereabove with bottom surfaces 72 engaged with the top portions 74 of coil springs 26. Placement of module ground strap 54 into position on subassembly includes pressing protectors 24 downwardly against the spring bias of coil springs 26 assuring that ground electrodes 76 extending above top portions of the casing of protectors 24 are biased against top section 56 of module ground strap 54 after assembly. Protrusion 78 of top strap section 56 is inserted into slit 80 (see FIGS. 4 and 5) near the top of protector housing section 20 to hold the module ground strap 54 in position in the recessed top 82 of protector housing section 20 after assembly which may thereafter be sealed by potting material. In FIG. 2 grooves 50 are seen along the bottoms of cavities 22 and extend through the housing walls at openings 94 (FIG. 4) with second end sections 48 of via wires 40 shown disposed therealong. In FIG. 3 wires 40 are shown disposed along grooves 50 along the bottoms of cavities 22 to illustrate the compression of coil spring 26 between wires 40 and bottoms 72 of protectors 24 when protector module 10 is fully assembled.

Figure 4:
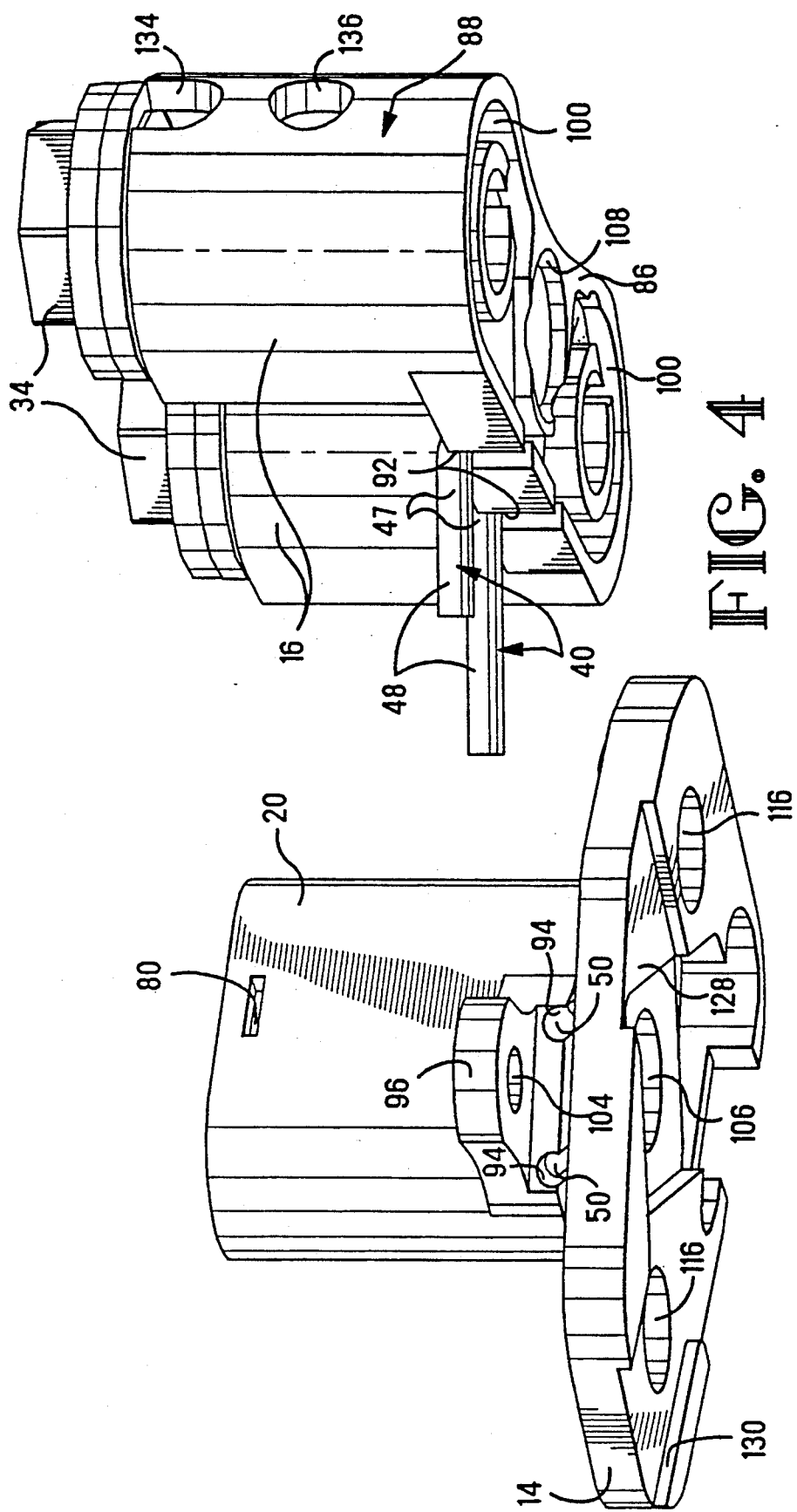
FIG. 4 is an isometric view of the terminal module being joined with the protector housing, with via wires coextending from the terminal module to be received into openings of the protector housing.

In FIG. 4 (and FIG. 5) terminal housing sections 16 are seen to be integrally joined to a common intermediate section 86 to facilitate molding of a single two-terminal housing member 88. First end sections 42 of via wires 40 have already been inserted through bottom openings 90 (See FIG. 1) before terminals 18 and actuators 32 were inserted into housing sections 16, and intermediate sections 47 of wires 40 are preferably disposed along guide channels 92 molded into the bottom of housing member 88, after which conventional potting material is preferably disposed along the guide channels sealing the via wires and holding them in position. Intermediate sections 47 coextend in parallel laterally from housing member 88 to second end sections 48, ready to be received into openings 94 of as-yet unloaded protector module housing 20.

A mounting flange 96 of protector subassembly 70 extends laterally to fit between the pair of terminal housing sections 16 when protector subassembly 70 is moved laterally toward and adjacent terminal housing sections 16 in a manner receiving second end sections 48 into the corresponding openings 94 near the bottom of cavities 22 which communicate with grooves 50. Referring to FIGS. 1 and 4, housing member 88 is positioned and adhered to base section 14 with annular embossments 98 cooperating with recesses 100 of the bottom surface of member 88 assuredly positioning the terminal housing sections 16 with respect to the base section 14. Mounting flange 96 includes a hole 104 which is aligned with a large embossment-receiving hole 106 of base section 14 and a corresponding hole 108 through intermediate section 86 extending between terminal housing sections 16.

Figure 5:
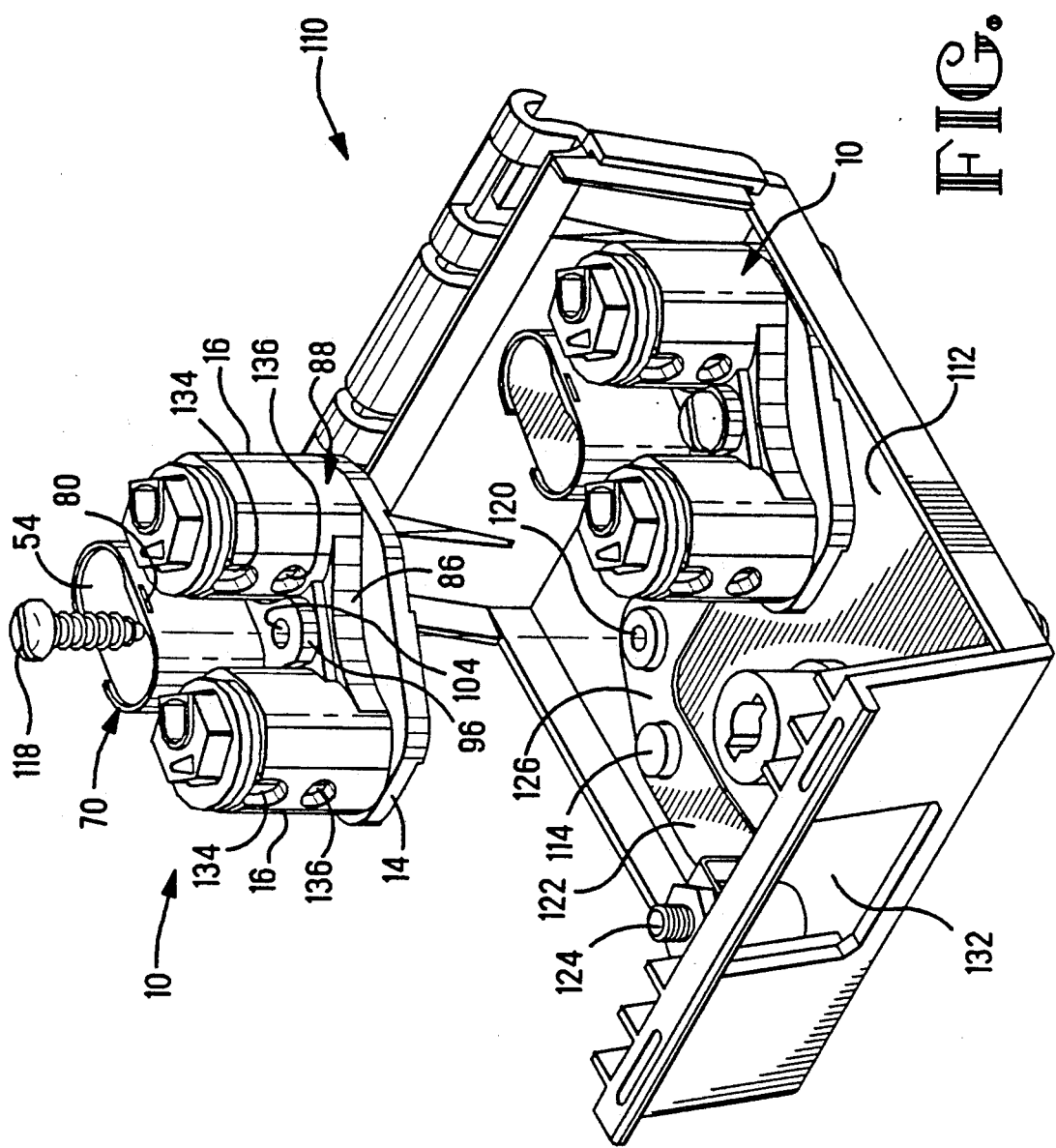
FIG. 5 is an isometric view of a protector module being mounted within an enclosure and ready for receipt of service and distribution cable conductors for termination to complete a protected customer telephone line.

A complete protector module 10 is shown being mounted into an enclosure 110 in FIG. 5, which already has a second protector module 10 already mounted therein along bottom or mounting 112. Embossments 114 extend upwardly from enclosure bottom 112 in mounting regions for each protector module 10 to be received into corresponding holes 116 to facilitate positioning of protector module 10 during mounting. A fastener such as trilobular selftapping screw 118 is used to extend through the aligned holes and be threaded into apertured embossment 120 along bottom 112 of enclosure 110 to secure protector module 10 in the enclosure, and threaded apertured embossment 120 is received into holes 106,108 upon mounting.

An enclosure ground strap 122 is mounted along enclosure bottom 112 to extend from a ground connection with a ground stud 124 of enclosure 110 and having apertures to be fitted over embossments 114,120 for both protector modules 10. A top surface portion 126 of enclosure ground strap 122 adjacent apertured embossment 120 is groundingly engaged under spring bias by contact sections 64 of tines 62 of module ground strap 54 upon completion of the mounting of protector module 10 to enclosure bottom 112, thus completing the necessary ground circuit for functioning of the protectors in the service line circuit. Bottom section 60 of module ground strap 54 is disposed along recess 128 of base section 14 (FIG. 4), and enclosure ground strap 122 is received into recess 130 of base section 14.

A customer cable end and corresponding distribution cable end are then able to be received through cable exit 132 which preferably is grommeted for sealing, and tip and ring conductor wires of each cable able to be inserted into wire-receiving openings 134,136 of each terminal housing section 16. Enclosure 110 also includes a lid (not shown) to complete a sealed assembly after the wires are terminated to the terminals.

A protector 24 as shown is available from Joslyn Electronic Systems Corporation of Goleta, Calif. under the trade identification "Gas Tube and Cannister", Part No. 72220. A spring 26 as shown is available from Connecticut Spring and Stamping Company, Farmington, Conn. under the trade identification volute conical compression spring, Part No. 920408 and is of beryllium copper. Via wires 40 may be tin-plated formed lengths of copper bus wire, and module ground strap 54 and enclosure ground strap 122 may be tin-plated phosphor bronze.

During in-service use the protector elements short out overvoltage surges to ground; upon being subjected to such a surge, a solder element within the protector melts and flows, allowing ground electrode 76 to recede into the casing or outer shell of the protector; coil spring 26 continues to apply spring bias against the bottom 72 of the outer shell and urges it ultimately against ground strap top section 56. The protector outer shell is in electrical engagement with active electrode of the protector and upon engagement with the ground strap establishes a ground of the service line thereby interrupting service to the customer until a replacement protector is inserted into position or until a replacement protector module 10 is connected to the service and distribution lines to reestablish the protected circuits.

Modifications and variations may occur to the embodiment disclosed herein which are within the spirit of the invention and the scope of the claims.

We claim:

1. A terminal block for crossconnecting respective conductors of two-wire cables having integral surge protection for the circuits thus defined, comprising:

a first housing module section having a pair of housing sections for respective terminals, and two terminals disposed in respective terminal-receiving cavities of said housing sections each having a pair of conductor-terminating section is exposed in respective conductor-receiving openings of said housing sections;

a second housing module section having a pair of protector elements having active and ground electrodes disposed in respective protector-receiving cavities thereof, and further having a module ground strap secured thereto having a first contact section in engagement with said ground electrodes of said protector elements and a second contact section exposed for grounding engagement with another ground circuit for system ground; and circuit elements extending from first end sections secured in electrical engagement with respective said terminals to second end sections engaged under spring bias with active electrodes of respective said protector elements upon complete assembly, whereby a terminal block is defined adapted for first conductors of first and second two-wire cables to be terminated to one of said terminals, and for second conductors of said first and second two-wire cables to be terminated to the other thereof thus crossconnecting the two-wire cables, and upon connecting said second contact section of said module ground strap to ground, protected circuits for said first and second conductors are defined.

2. The assembly as set forth in claim 1 wherein said circuit elements are formed wire members.

3. The assembly as set forth in claim 2 wherein said formed wire members include first end sections extending into terminal-receiving cavities for compressive electrical engagement with respective said terminals, and second end sections extending into protector-receiving cavities for engagement by a compressive spring member to an active electrode of a respective said protector element.

4. The assembly as set forth in claim 3 wherein each said protector element is held in spring biased engagement by said compressive spring member with said ground electrode thereof against first contact section secured to said housing assembly, and having an outer shell electrically engaged with said active electrode and insulated from said ground electrode, said outer shell facing and spaced from said first contact section during in-service use, and said second housing module section adapted to provide clearance between said outer shell and said first contact section.

5. An assembly of a terminal block in an enclosure for crossconnecting respective conductors of two-wire cables having integral surge protection for the circuits thus defined, comprising:

an enclosure and at least one terminal block contained therein, said at least one terminal block comprising:

a first housing module section having a pair of housing section is for respective terminals, and two terminals disposed in respective terminal-receiving cavities of said housing sections each having a pair of conductor-terminating sections exposed in respective conductor-receiving openings of said housing sections;

a second housing module section having a pair of protector elements having active and ground electrodes disposed in respective protector-receiving cavities thereof, and further having a module ground strap secured thereto having a first contact section in engagement with said ground electrodes of said protector elements and a second contact section exposed for grounding engagement with another ground circuit for system ground; and circuit elements extending from first end sections secured in electrical engagement with respective said terminals to second end sections engageable under spring bias with active electrodes of respective said protector elements upon complete assembly; and said enclosure including a ground strap mounted along a mounting surface thereof adapted to receive thereinto said at least one terminal block in a corresponding mounting region and be mounted to a mounting surface thereof, said ground strap connected to a ground post exposed to be engaged to an external system ground and extending to each said corresponding mounting region to be electrically engaged by said exposed second contact section of a respective said module ground strap upon mounting of said terminal block to said mounting surface at said mounting region, whereby the terminal block defined is adapted for first conductors of said first and second two-wire cables to be terminated to one of said terminals, and for second conductors of said first and second two-wire cables to be terminated to the other thereof thus crossconnecting the two-wire cables, thereby defining protected circuits for said first and second conductors.

6. The assembly as set forth in claim 5 wherein said enclosure mounting surface includes embossments for positioning a respective said terminal block for mounting in said mounting region.

7. The assembly as set forth in claim 6 wherein said enclosure ground strap includes apertures to receive therethrough said embossments, thereby positioning said enclosure ground strap in said mounting region.

* * * * *

UNITED STATES PATENT AND TRADEMARK OFFICE
CERTIFICATE OF CORRECTION

PATENT NO. : 5,321,577
DATED : June 14, 1994
INVENTOR(S) : Harry M. Capper et al.

It is certified that error appears in the above-identified patent and that said Letters Patent is hereby corrected as shown below:

Col. 6
 In claim 1, line 8: change "section is" to read --sections--

Col. 7
 In claim 4, line 4: after "against" insert --said--

In claim 5, line 9: change "section is" to read --sections--

Signed and Sealed this

Sixth Day of September, 1994

Attest:

BRUCE LEHMAN

Attesting Officer

Commissioner of Patents and Trademarks